United States Patent
Kemmner et al.

(10) Patent No.: US 6,196,249 B1
(45) Date of Patent: Mar. 6, 2001

(54) PRESSURE REGULATING METHOD AND APPARATUS

(75) Inventors: Benjamin Kemmner, Baden-Baden; Thomas Frietsch, Oberkirch; Rainer Eidloth, Bamberg, all of (DE)

(73) Assignee: LuK Getriebe-Systeme GmbH, Buhl/Baden (DE)

(*) Notice: Subject to any disclaimer, the term of this patent is extended or adjusted under 35 U.S.C. 154(b) by 0 days.

(21) Appl. No.: 09/344,186

(22) Filed: Jun. 24, 1999

(30) Foreign Application Priority Data

Jun. 30, 1998 (DE) .............................. 198 29 148

(51) Int. Cl.$^7$ .......................... F15B 13/043; G05D 16/20
(52) U.S. Cl. .......................... 137/82; 137/625.61; 251/24
(58) Field of Search .............................. 137/82, 625.61; 251/24

(56) References Cited

U.S. PATENT DOCUMENTS

| | | | | |
|---|---|---|---|---|
| 2,417,994 | * | 3/1947 | Sheets ..................................... | 251/24 |
| 3,151,660 | * | 10/1964 | Evraets ................................ | 251/24 X |
| 3,586,287 | * | 6/1971 | Knobel ................................... | 251/24 |
| 3,645,293 | * | 2/1972 | Pedersen ........................... | 137/82 X |
| 3,699,991 | * | 10/1972 | Munch ................................... | 137/82 |
| 3,734,117 | * | 5/1973 | Atkinson ................................ | 137/82 |
| 5,611,370 | * | 3/1997 | Najmolhoda et al. ........... | 137/625.61 |
| 5,667,448 | | 9/1997 | Friedmann . | |
| 5,674,155 | | 10/1997 | Otto et al. . | |
| 5,845,667 | * | 12/1998 | Najmolhoda et al. ............. | 137/82 X |
| 6,019,120 | * | 2/2000 | Najmolhoda et al. ................. | 137/82 |

FOREIGN PATENT DOCUMENTS

| | | | | |
|---|---|---|---|---|
| 2840517 | * | 3/1980 | (DE) ..................................... | 251/24 |
| 421810 | * | 8/1974 | (SU) ..................................... | 251/24 |
| 985766 | * | 12/1982 | (SU) ..................................... | 251/24 |

* cited by examiner

Primary Examiner—Gerald A. Michalsky
(74) Attorney, Agent, or Firm—Darby & Darby

(57) ABSTRACT

The pressure of hydraulic fluid which is supplied to the continuously variable transmission in the power train of a motor vehicle is regulated by an apparatus wherein an adjustable pilot valve can receive fluid from a pilot conduit leading to a pressure reducing valve. The pilot conduit normally receives fluid from a further conduit, wherein the pressure of fluid is at least substantially constant, by way of a flow restrictor. A branch conduit serves to evacuate fluid from the pilot conduit into the pilot valve when the latter is at least partially open. The fluid-discharging end of the flow restrictor confronts the inlet of the branch conduit, and such inlet is narrowed to reduce the likelihood of turbulence developing in the fluid stream flowing from the pilot conduit, across the further conduit and into the inlet of the pilot valve.

16 Claims, 3 Drawing Sheets

PRESSURE REGULATING METHOD AND APPARATUS

BACKGROUND OF THE INVENTION

The present invention relates to improvements in pressure regulating methods and apparatus.

It is often necessary to design a hydraulic control system in such a way that a regulating or control valve (e.g., a pressure reducing valve) is installed downstream of a pilot valve or servo valve (hereinafter called pilot valve). The latter serves to select fluid pressure in a (pilot) conduit which is connected with an inlet of the regulating valve. An outlet of the regulating valve serves to convey fluid to one or more consumers, e.g., to a so-called continuously variable transmission (CVT). Reference may be had, for example, to commonly owned U.S. Pat. No. 5,667,448 (granted Sep. 16, 1997 to Oswald Friedmann for "POWER TRAIN") and to commonly owned U.S. Pat. No. 5,674,155 (granted Oct. 7, 1997 to Dieter Otto et al. for "METHOD OF AND APPARATUS FOR TRANSMITTING TORQUE IN THE POWER TRAINS OF MOTOR VEHICLES"). The disclosures of the just enumerated US patents as well as of all other patents and patent applications (including commonly owned pending German priority patent application Ser. No. 198 29 148.5 filed Jun. 30, 1998) are incorporated herein by reference.

A conventional pilot valve-regulating valve combination can employ a pilot valve having an inlet connected to a source of constant-pressure (or substantially constant-pressure) fluid by a constant-pressure conduit which contains a flow restrictor) e.g., an adjustable diaphragm, and can communicate with a pilot conduit serving to convey fluid to the regulating valve. An adjustable valving element of the pilot valve can divert varying quantities of fluid from the pilot conduit (downstream of the flow restrictor) to a sump or to another destination so that the pilot valve can select the pressure of fluid entering the body of the regulating valve.

A drawback of heretofore known pressure regulating methods and apparatus of the just outlined character is that (for example, due to often unavoidable leakage of fluid from the pilot valve and/or from other parts of the apparatus), the pressure in the pilot conduit (between the pilot valve and the regulating valve) cannot match the pressure of fluid in the constant-pressure conduit. Moreover, even if the valving element of the pilot valve is moved to a fully open position (in which the valving element does not interfere with the flow of fluid from the pilot conduit, through the pilot valve, and on to to the sump), the pilot pressure of fluid (in the pilot conduit) still exceeds zero pressure. Such residual pressure in the pilot conduit is attributable to losses developing in the region of the flow restrictor, e.g., to losses in the path defined by the constant-pressure conduit, by the flow restrictor, by a branch conduit connecting the constant-pressure conduit (downstream of the flow restrictor) to the inlet of the pilot valve, and by the conduit connecting the outlet of the pilot valve with the sump or with another receptacle for hydraulic fluid.

A further drawback of the aforedescribed conventional pressure regulating apparatus is that, due to turbulence which develops in the fluid path in the region of the flow restrictor, at least a high percentage of kinetic energy of the fluid (such as oil) is ultimately converted into heat.

OBJECTS OF THE INVENTION

An object of the invention is to provide a novel and improved method of regulating the pressure of hydraulic fluid which is utilized in cylinder-and-piston units and/or other constituents of transmissions and/or other fluid-operated components, e.g., in the power trains of motor vehicles.

Another object of the invention is to provide a method which can be practiced without the generation of appreciable, noticeable or even any quantities of heat.

A further object of the invention is to provide a method which can be practiced by resorting to a relatively simple, compact and inexpensive apparatus.

An additional object of the invention is to provide a method which renders it possible to reduce the pilot pressure between the pilot valve and the regulating valve of the appparatus to a threshold value below that achievable by resorting to heretofore known methods.

Still another object of the invention is to provide an apparatus which can be utilized for the practice of the above outlined method and is designed in such a way that the afore described drawbacks of conventional apparatus can be avoided in a simple, effective and inexpensive manner.

A further object of the invention is to provide a novel and improved pilot valve-regulating valve combination for use in the above outlined apparatus.

Another object of the invention is to provide the improved apparatus with a novel combination of a flow restrictor and conduits for conveying hydraulic fluid from a source of fluid at an at least substantially constant pressure (e.g., from a valve) to the pilot valve and from the pilot valve to the regulating valve.

An additional object of the invention is to provide an apparatus which can be utilized in the power trains of motor vehicles as a superior substitute for the afore described and other conventional pressure regulating apparatus.

Still another object of the invention is to provide a fluid-consuming or fluid-operated unit, such as a continuously operable transmission, which embodies an apparatus of the above outlined character.

A further object of the invention is to provide an apparatus which exhibits the advantages but does not embody the drawbacks of standard fluid pressure regulating apparatus utilizing combinations of pilot valves and regulating valves in the path of hydraulic fluid flow from a source of constant-pressure fluid to a consumer requiring fluid at two or more different pressures.

Another object of the invention is to provide a motor vehicle, such as a passenger car, having a power train embodying a unit which consumes or is operated by a hydraulic fluid and which receives hydraulic fluid from the above outlined apparatus in accordance with a method of the present invention.

SUMMARY OF THE INVENTION

One feature of the instant invention resides in the provision of a method of controlling the pressure of a hydraulic fluid (e.g., a fluid which includes or constitutes a lubricant such as oil) in a pilot conduit which receives fluid at an at least substantially constant pressure from a constant-pressure conduit by way of a flow restrictor and a pilot valve which is adjustable to permit outflow of fluid from the pilot conduit through a branch conduit at a variable rate and to thus lower the static pressure of fluid in the pilot conduit in response to increasing rate of fluid outflow from the pilot conduit. The improved method comprises the steps of (a) establishing for the flow of fluid from the pilot conduit to the pilot valve a path extending from the pilot conduit first through the flow restrictor and thereupon through the branch conduit into and through the pilot valve, and (b) varying the speed of the fluid flowing through the flow restrictor to thus influence the static pressure of fluid in the pilot conduit.

The speed varying step can include adjusting the pilot valve to select the rate of fluid flow from the branch conduit into the pilot valve. The fluid which is permitted to flow from the pilot conduit, through the branch conduit and through the pilot valve can be confined in (i.e., collected by) a suitable receptacle, e.g., in a sump.

Another feature of the invention resides in the provision of an apparatus for controlling the pressure of a hydraulic fluid, e.g., a transmission fluid, a lubricant or the like. The apparatus comprises a pilot valve having an inlet, an outlet and means for varying the rate of fluid flow from the inlet to the outlet, a source of constant-pressure hydraulic fluid including a first conduit having an outlet, a branch conduit connecting the outlet of the first conduit with the inlet of the pilot valve, a pilot conduit which is arranged to receive fluid from the branch conduit and wherein the static pressure of fluid decreases in response to increasing rate of fluid outflow from the pilot conduit, and a flow restrictor which establishes an evacuating path for the outflow of fluid from the pilot conduit into the branch conduit.

The flow restrictor is installed between the first conduit and the pilot conduit. The latter establishes a second path for the flow of fluid to at least one of the first conduit and the branch conduit; the evacuating path can be oriented in such a way that it crosses the second path.

In accordance with a presently preferred embodiment, the first conduit includes a portion which constitutes a portion of the pilot conduit (for example, such portions of the first and pilot conduits can be disposed back-to-back), and the flow restrictor is provided in such portion of the first conduit. The inlet of the branch conduit in such apparatus is positioned to receive fluid flowing along the evacuating path from the pilot conduit, through the flow restrictor and across the first conduit; the outlet of such branch conduit is connected with the inlet of the pilot vave. The dimensions of the just described branch conduit can be selected in such a way that its inlet has a first cross-sectional area and that the branch conduit further includes a portion adjacent the inlet of the branch conduit (e.g., extending all the way from the inlet of the branch conduit and to the inlet of the pilot valve) and having a second cross-sectional area greater than the first cross-sectional area.

The just described inlet and portion of the branch conduit constitute a means for opposing the development of turbulence (such as vortices) in the evacuating path.

The means for varying the rate of fluid flow from the inlet to the outlet of the pilot valve can include a valving element (e.g., a piston which is reciprocable in the housing or body of the pilot valve) and means for moving the valving element relative to the body of the pilot valve. The moving means can comprise at least one magnet, e.g., an electromagnet.

The orientation of the first conduit and the pilot conduit can be such that these conduits include portions which are at least substantially normal to the branch conduit. The latter can have at least one bend between the flow restrictor and the inlet of the pilot valve. Alternatively, the branch conduit can be a straight conduit having an inlet communicating with the pilot conduit and an outlet communicating with the inlet of the pilot valve.

The improved apparatus can further comprise a regulating valve having an inlet arranged to receive fluid from the pilot conduit and an outlet, a consumer of fluid, and a control conduit connecting the outlet of the regulating valve with at least one inlet of the consumer. For example, the consumer can comprise a transmission in the power train of a motor vehicle, e.g., a so-called continuously variable transmission (CVT). A typical example of a continuously variable transmission is a transmission employing two parallel shafts each of which carries an adjustable pulley, and an endless belt or chain which is trained over the pulleys. The fluid which is supplied by the regulating valve by way of the control conduit can be utilized to vary the ratio of the transmission and/or to select the extent of frictional engagement between the flanges of the adjustable pulleys and endless chain or belt.

The novel features which are considered as characteristic of the invention are set forth in particular in the appended claims. The improved apparatus itself, however, both as to its construction and its mode of operation, together with numerous additional features and attributes thereof, will be best understood upon perusal of the following detailed description of certain presently preferred specific embodiments with reference to the accompanying drawings.

DESCRIPTION OF PREFERRED EMBODIMENTS

Figure 1:
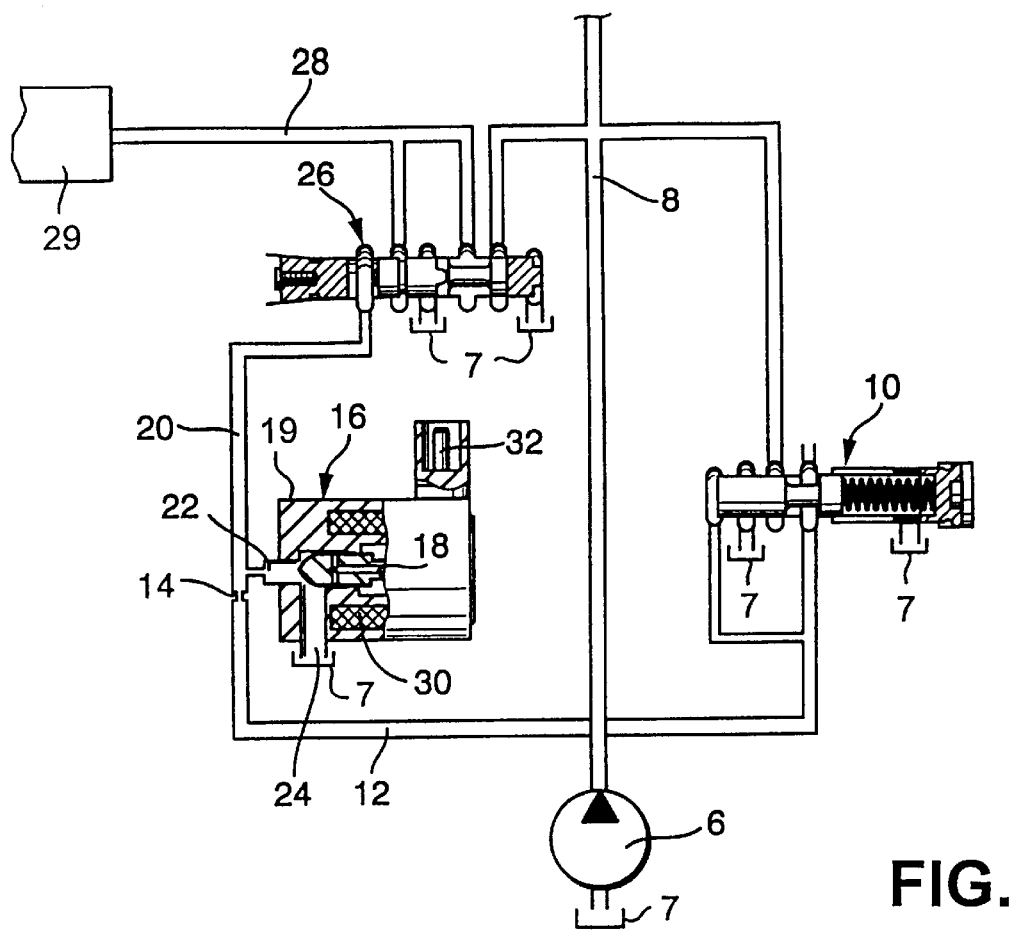
FIG. 1 is a fragmentary schematic partly elevational and partly sectional view of a conventional fluid pressure regulating apparatus.

FIG. 1 shows certain component parts of a conventional apparatus which includes a pump 6 serving to draw hydraulic fluid (such as oil and hereinafter referred to as fluid) from a source 7, e.g., a sump. The outlet of the pump 6 delivers a stream of fluid into a main conduit 8 at a pressure which can exceed the pressure required in a control conduit 28 serving to deliver at least one stream of pressurized fluid to at least one inlet of a consumer 29, e.g., a continuously variable transmission (CVT) of the type disclosed in the commonly owned U.S. Pat. No. 5,667,448 or 5,674,155.

The main conduit 8 supplies pressurized fluid to an inlet of a constant-pressure valve 10 (this valve can be replaced with a pressure regulating valve, not shown) having an outlet connected with the inlet or intake end of a (first) constant-pressure conduit 12. The valve 10 supplies fluid at an at least substantially constant pressure. The discharge end or outlet of the constant-pressure conduit 12 delivers fluid to the inlet of a pilot conduit 20 by way of a flow restrictor of throttle 14 having a passage with a fixed or variable effective cross-sectional area for the flow of fluid from the constant-pressure valve 10 to the pilot conduit 20.

The outlet of the pilot conduit 20 (i.e., the outlet of the constant-pressure conduit 12 downstream of the flow restrictor 14) is further connected with an inlet of a pilot valve 16 by a branch conduit 22. The valve 16 has an outlet 24 which can discharge fluid into the sump 7 when a reciprocable valving element (such as a piston) 18 in the housing or body 19 of the valve 16 permits at least some fluid to flow along a path extending from the pilot conduit 20, through the branch conduit 22, between the inlet of the housing 19 and the outlet 24, and from the outlet 24 into the sump 7.

The valving element 18 is movable by a magnet, preferably an electromagnet having at least one coil 30 arranged to receive electric current from a suitable source 32. The sump 7 (or at least that portion of the sump which can receive fluid from the outlet 24) can be replaced with a tank or any other suitable receptacle for hydraulic fluid which flows along the aforementioned (evacuating) path from the pilot conduit 20 to and beyond the outlet 24 when the pilot valve 16 is at least partially open. At such time, the valving element or piston 18 is spaced apart from a seat of the housing 19; the seat is adjacent the respective end of the branch conduit 22, i.e., it is located at the left-hand end of the cylinder chamber for the reciprocable valving element 18 in the housing 19.

When the pump 6 is driven and the pilot valve 16 is at least substantially sealed, the conduit 12 delivers a stream of fluid to the pilot conduit 20 via flow restrictor 14. The outlet of the conduit 20 delivers fluid to one inlet of a pressure reducing valve 26 (e.g., a slide valve) having an outlet connected with the consumer 29 by way of the aforementioned control conduit 28. The valve 26 regulates the pressure of fluid in the conduit 28 and in the consumer 29.

The exact construction of the valves 10, 16 and 26 is known and, therefore, need not be described here. The pilot valve 16 is normally closed, i.e., the valving element 16 dwells in the left-hand end position so that the branch conduit 22 is at least substantially sealed from the outlet 24 in the housing 19 of the valve 16. The valving element 18 is held in the left-hand end position when the intensity of the magnetic field established by the coil or coils 30 assumes a maximum value.

Figure 3:
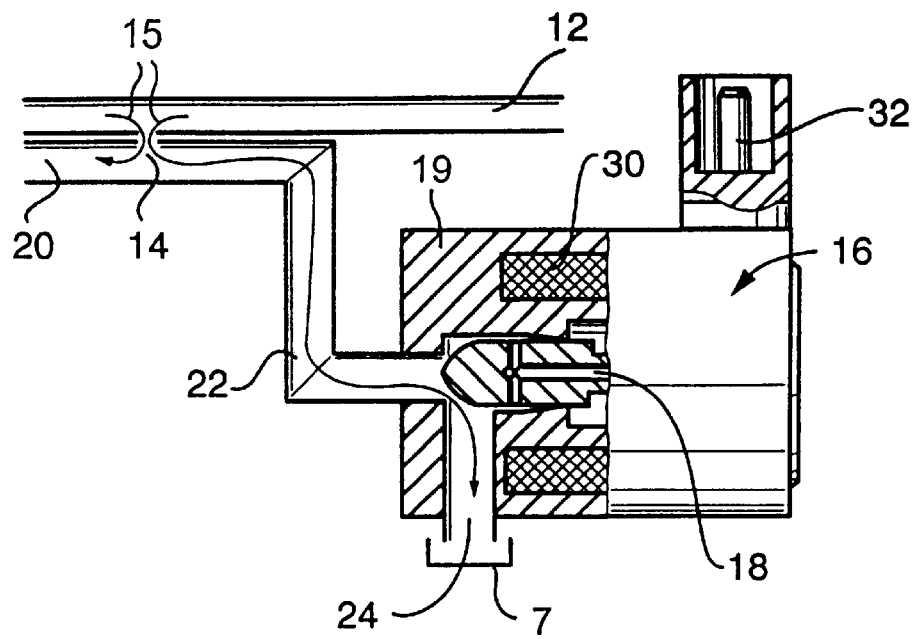
FIG. 3 is a fragmentary schematic partly elevational and partly sectional view of second conventional apparatus.

FIG. 3 shows a portion of another conventional fluid pressure regulating apparatus. All such parts which are identical with or clearly analogous to those shown in FIG. 1 are denoted by similar characters. The only difference is that straight portions of the conduits 12, 20 are adjacent each other and that the flow restrictor 14 is arranged to convey fluid between such straight portions.

The mode of operation of the apparatus shown in FIGS. 1 and 3 will be explained with reference to the coordinate system of FIG. 2 wherein the fluid pressure (in bar) in the pilot conduit 20 is measured along the ordinate, and the current (in Amperes) supplied to the coil or coils 30 is measured along the abscissa.

It is assumed that the fluid pressure in the first conduit 12 is at least substantially constant and amounts to between about 5 and 5.3 bar. The flow restrictor 14 can constitute an adjustable diaphragm and is assumed to be set for the establishment of a circular or substantially circular opening with a diameter of approximately 0.8 mm.

When the intensity of the magnetic field established by the coil or coils 30 reaches a maximum value (e.g., when the current furnished to the terminal(s) 32 has a strength in the range of one Ampere), the valving element 18 engages its seat and thus seals or substantially seals the branch conduit 22 from the outlet 24 of the housing 19. Consequently, the pressure of fluid in the conduits 20 and 22 is maintained at a maximum value, e.g., at slightly less than 5 bar. The pressure of fluid in the conduits 20, 22 cannot rise to the pressure of fluid in the first (constant-pressure) conduit 12 due to leakage of the pilot valve 16 and/or due to other leak or leaks in the apparatus embodying the structure shown in FIG. 1 or FIG. 3.

If the strength of the current flowing through the coil or coils 30 is reduced, the valving element 18 proceeds to move away from the seat in the housing 19. This establishes a flow of fluid from the pilot conduit 20, through the branch conduit 22, from the inlet to the outlet 24 of the housing 19, and into the sump 7. When the pilot valve 16 is fully open, the residual pressure of fluid in the pilot conduit 20 amounts to between about 0.2 and 0.4 bar. The existence of such residual pressure is attributable to friction between the fluid in the path. from the pilot conduit 20 into the sump 7 (via pilot valve 16), and the surrounding surfaces.

Furthermore, and as shown in FIG. 3 by arrows 15, kinetic energy of the fluid flowing through the flow restrictor 14 causes the generation of turbulence (such as eddies or vortices immediately downstream of the flow restrictor) which, in turn, entails a heating of the conduits 12, 20 and a beating of the conveyed fluid.

Figure 2:
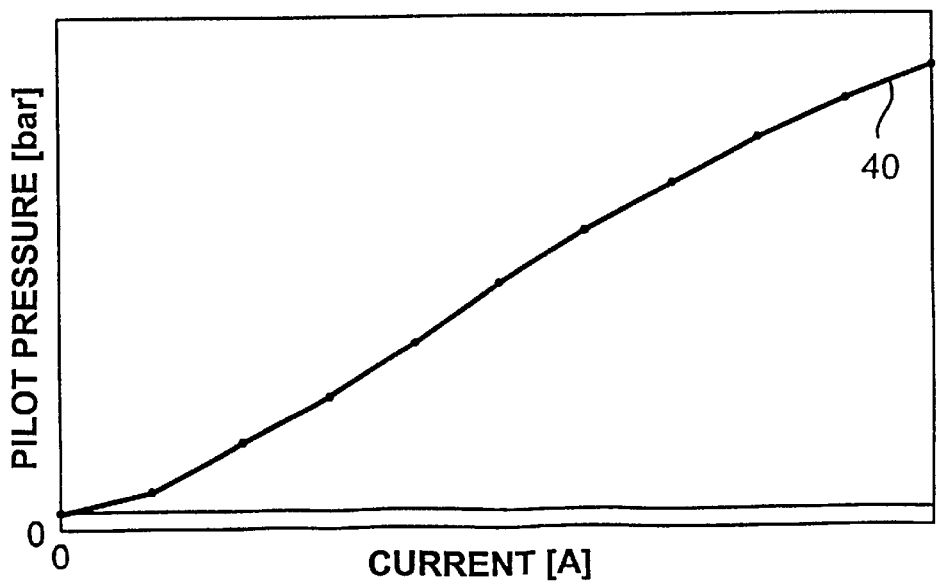
FIG. 2 is a diagram wherein the curve represents the relationship between the changes of fluid pressure in the pilot conduit and the changes in the setting of the pilot valve in the apparatus of FIG. 1.

The characteristic curve 40 in the coordinate system of FIG. 2 indicates that, when the valving element 18 is remote from its seat in the housing 19, the relationship between the amperage of the current supplied by the coil or coils 30 and the pressure in the pilot valve 16 deviates from a linear relationship.

Figure 4:
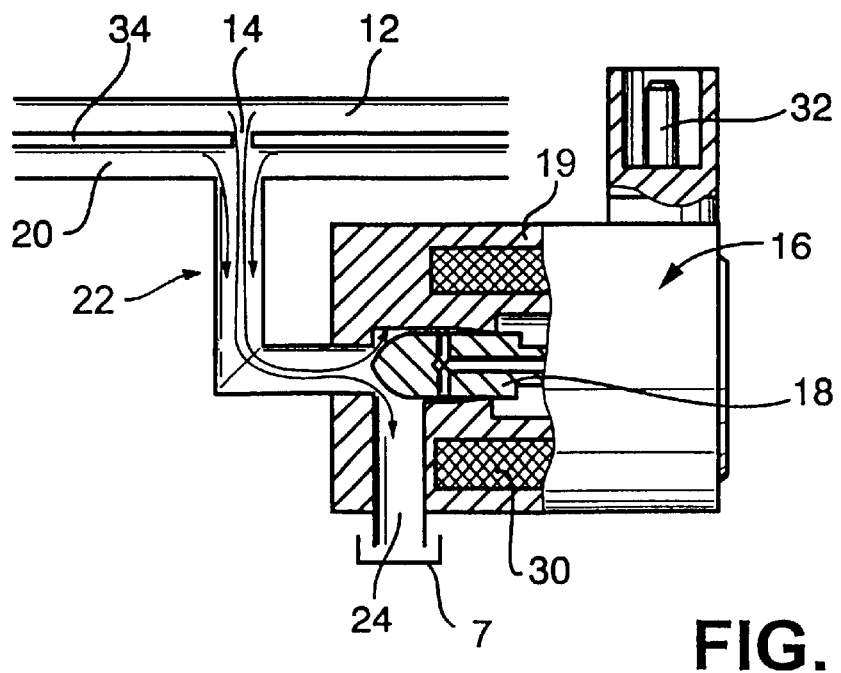
FIG. 4 is a view similar to that of FIG. 3 but showing certain constituents of an apparatus which embodies one form of the invention.

FIG. 4 shows a portion of an apparatus which embodies one form of the present invention. The reference characters utilized in FIG. 4 are largely identical with those shown in FIG. 1 or 3 except for the numeral 34 which denotes a portion or wall of the conduit 20 of one piece with and thus constituting a portion of the conduit 20. Furthermore, the flow restrictor or nozzle 14 is provided in the common portion 34 of the conduits 12, 20 in such a way that it can discharge fluid from the conduit 12, across the conduit 20 and directly into the inlet of the branch conduit 22. The latter has a bend 22a between its inlet (at 14) and its outlet (i.e., the inlet of the pilot valve 16). Thus, when the valve 16 is open to an extent determined by the intensity of magnetic field being then established by the coil or coils 30, the fluid can flow from the constant-pressure conduit 12, across the pilot conduit 20 (via flow restrictor 14) and directly into the inlet of the branch conduit 22 to thereupon flow to the sump 7 along the path established by the housing 19 of the pilot valve 16.

The speed of the fluid flowing from the conduit 12 into the conduit 22 across the conduit 20 is very high (because the orifice defined by the flow restrictor 14 is preferably small). Due to such elevated speed of the fluid flowing into the branch conduit 22, the static pressure in the conduit 20 is reduced in accordance with the Bernoulli theorem; this causes the flow restrictor 14 to act as a jet pump and to draw liquid from the conduit 20 into the branch conduit 22.

Figure 5:
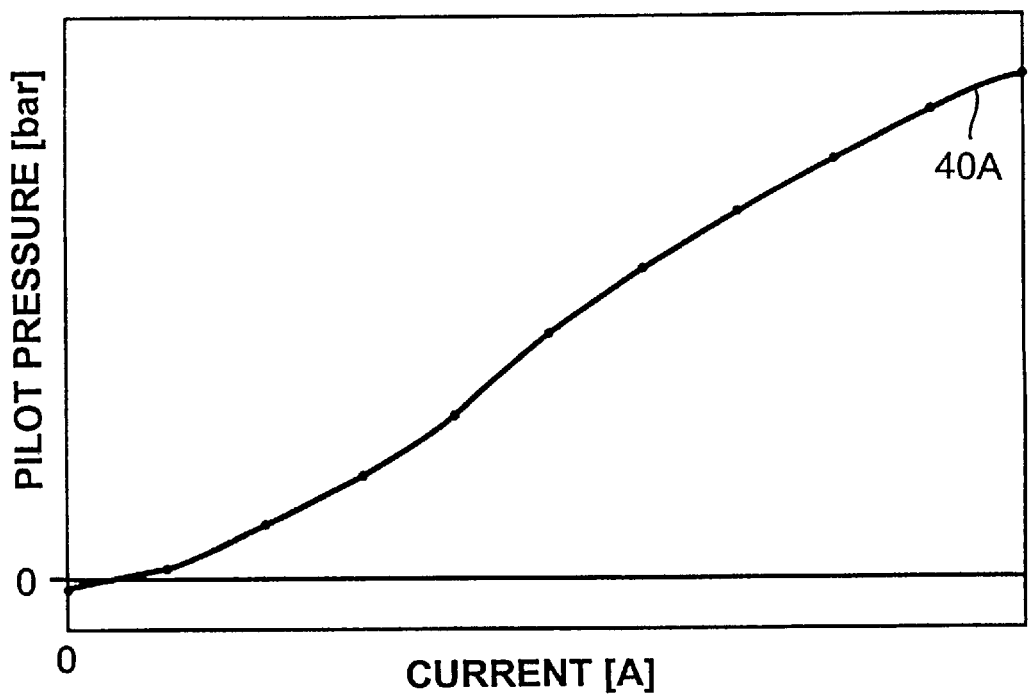
FIG. 5 is a diagram wherein the curve denotes the relationship between the changes of pressure in the pilot conduit and the changes in the setting of the pilot valve in the apparatus of FIG. 4.

FIG. 5 shows a coordinate system corresponding to that shown in FIG. 2, except that the fluid pressure (measured in bar) in the conduit 20 of FIG. 4 is related to the amperage of the current supplied to the coil(s) 30 shown in FIG. 4. When the pilot valve 16 of FIG. 4 is at least nearly fully open, the pressure in the pilot conduit 20 drops below the pressure indicated in FIG. 2. Thus, and a shown in FIG. 5, the pressure can drop below the zero value. This ensures that the relationship between the pilot pressure in the conduit 20 and the amperage of the current being supplied to the coil(s) 30 remains linear even when the fluid pressure in the pilot conduit 20 is very low, i.e., when the valving element 18 is remote from its seat in the valve housing 19. This amounts to a widening of the operating range of the improved apparatus beyond the operating range of conventional apparatus. When the pressure of fluid in the pilot conduit 20 is relatively high, the difference between the corresponding portions of the curves 40 and 40A respectively shown in FIGS. 2 and 5 is or can be negligible. The reason is that when the fluid pressure in the conduit 20 is relatively high (because the valve 16 is fully or nearly fully closed), the speed of fluid flow from the conduit 20 via conduit 22 and valve 16 (in the apparatus of FIG. 4) is low or negligible.

An advantage of the improved method and apparatus is that they render it possible to widen or broaden the operating range within which one can control, by means of the pilot pressure, the operations of other valves such as slide valves or the pressure reducing valve and/or other components of the apparatus and the power train. Moreover, one can establish a more predictable linear relationship between the pressure in the pilot conduit 20 and the (magnetic) force with which the valving element 18 is urged to its operative (sealing) position of engagement with the seat in the housing 19 to thus prevent or reduce the rate of fluid flow from the pilot conduit 20, through the branch conduit 22 and out of the housing 19 via outlet 24.

It is clear that the afore described advantages of the improved method and apparatus become even more pronounced if the velocity of the fluid stream flowing from the pilot conduit 20, through the branch conduit 22 and through the housing 19 of the pilot valve 16 increases.

Figure 6:
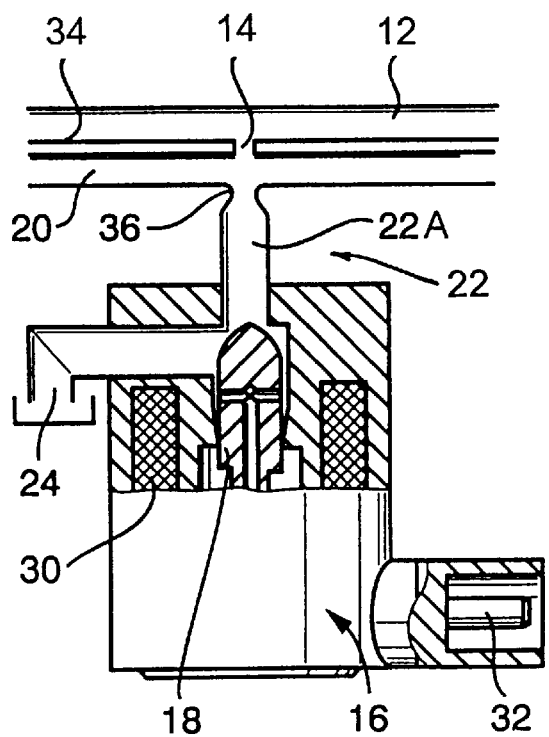
FIG. 6 is a fragmentary schematic partly elevational and partly sectional view of a novel apparatus which constitutes a modification of the apparatus shown in FIG. 4.

FIG. 6 illustrates a portion of an apparatus which constitutes a modification of the novel apparatus shown in FIG. 4. One difference between the apparatus of FIGS. 4 and 6 is that the branch conduit 22 of FIG. 6 includes an end portion 36 merging into the adjacent straight portion of the pilot conduit 20 and a straight portion 22A which extends to the inlet of the body or housing 19 of the pilot valve 16. The cross-sectional area of the passage defined by the inlet 36 is smaller than that of the passage defined by the portion 22A. The straight branch conduit 22 of FIG. 6 renders it possible to dispense with the bend of the type shown at 22a in FIG. 4. A bend (such as 22a) might be necessary under certain circumstances (e.g., to take advantage of the space which is available for the apparatus); however, such bend or bends necessarily affect the velocity of the fluid flowing from the pilot conduit 20 toward and into the valve 16.

An advantage of the smaller-diameter inlet 36 of the branch conduit 22 of FIG. 6 is that it enhances the velocity of the fluid stream flowing through the conduit 22 and into the body 19 of the pilot valve 16. The internal surface of the inlet 36 is preferably rounded and smooth. Moreover, the inlet 36 enables the branch conduit 22 of FIG. 6 to act as a highly effective jet pump, i.e., a pump generating a suction much more pronounced than that achievable with the branch conduit 22 and flow restrictor 14 shown in FIG. 1 or 3.

The flow restrictor 14 of FIG. 6 is provided in that portion of the constant-pressure conduit 12 which is common to the pilot conduit 20, the same as in FIG. 4.

It has been found that the operation of the improved apparatus is particularly satisfactory (especially as concerns savings in energy) if the pressure in the pilot conduit 20 is zero bar when the current strength in the coil or coils 30 is at least very close to 0 mA.

It is also desirable to design the improved apparatus in such a way that the pilot pressure in the conduit 20 is zero bar when the strength of the current flowing in the coil or coils 30 is slightly above 0 mA. This is of particular advantage in the event of variations of temperature and/or viscosity of the conveyed fluid. Under such circumstances, the O-bar operating point can be caused to conform (i.e., it can be adapted) to the operating conditions by varying the strength of the current in the windings of the coil or coils 30.

To summarize, one of the important advantages of the improved method and apparatus is that the fluid pressure in the pilot conduit 20 can be lowered below that in the pilot conduit of a conventional apparatus when the pilot valve 16 offers little or no resistance to the flow of fluid from the conduit 20, via conduit 22, through the valve 16 and into the sump 7. This is accomplished in that the kinetic energy of the stream of fluid flowing from the conduit 12, through the flow restrictor 14 and branch conduit 22 into and from the valve 16 is utilized to further reduce the fluid pressure in the conduit 20.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to methods of and apparatus for regulating the pressure of hydraulic fluid and, therefore, such adaptations should and are intended to be comprehended within the meaning and range of equivalence of the appended claims.

What it claimed is:

1. Apparatus for controlling the pressure of a hydraulic fluid, comprising:
   a pilot valve having an inlet, an outlet and means for varying the rate of fluid flow from said inlet to said outlet;
   a source of constant-pressure hydraulic fluid including a first conduit having an outlet;
   a branch conduit connecting the outlet of said first conduit with the inlet of said pilot valve;
   a pilot conduit which is arranged to receive fluid from said branch conduit and wherein the static pressure of fluid decreases in response to increasing rate of fluid outflow from the pilot conduit; and
   a flow restrictor establishing an evacuating path for the outflow of fluid from said pilot conduit into said branch conduit.

2. The apparatus of claim 1, wherein said flow restrictor is installed between said first conduit and said pilot conduit.

3. The apparatus of claim 1, wherein said first conduit establishes a second path for the flow of fluid to at least one of said first conduit and said branch conduit, said evacuating path crossing said second path.

4. The apparatus of claim 1, wherein said first conduit includes a portion constituting a portion of said pilot conduit, said flow restrictor being provided in said portion of said first conduit.

5. The apparatus of claim 4, wherein said branch conduit has an inlet positioned to receive fluid flowing along said evacuating path from said pilot conduit, through said flow restrictor and across said first conduit, said branch conduit further having an outlet connected with the inlet of said pilot valve.

6. The apparatus of claim 5, wherein the inlet of said branch conduit has a first cross-sectional area and said branch conduit further includes a portion adjacent said inlet of said branch conduit and having a second cross-sectional area greater than said first cross-sectional area.

7. The apparatus of claim 1, wherein said branch conduit includes means for opposing the development of turbulence in said evacuating path.

8. The apparatus of claim 1, wherein said pilot valve has a body an said means for varying the rate of fluid flow from the inlet to the outlet of said pilot valve comprises a valving element which is reciprocable in said body.

9. The apparatus of claim 8, wherein said pilot valve further comprises means for moving said valving element relative to said body.

10. The apparatus of claim 9, wherein said means for moving comprises at least one magnet.

11. The apparatus of claim 10, wherein said at least one magnet is an electromagnet.

12. The apparatus of claim 1, wherein said first conduit and said pilot conduit include portions which are at least substantially normal to said branch conduit.

13. The apparatus of claim 1, wherein said branch conduit has at least one bend between said flow restrictor and said inlet of said pilot valve.

14. The apparatus of claim 1, wherein said branch conduit is straight and has an inlet communicating with said pilot conduit and an outlet communicating with the inlet of said pilot valve.

15. The apparatus of claim 1, further comprising a regulating valve having an inlet arranged to receive fluid from said pilot conduit and an outlet, a consumer of fluid, and a control conduit connecting the outlet of said regulating valve with said consumer.

16. The apparatus of claim 15, wherein said consumer includes a transmission in a power train of a motor vehicle.

* * * * *